May 30, 1939.     E. ELDRIDGE     2,160,723
LAST BLOCK GAUGE FOR LAST LATHES
Filed Oct. 24, 1936
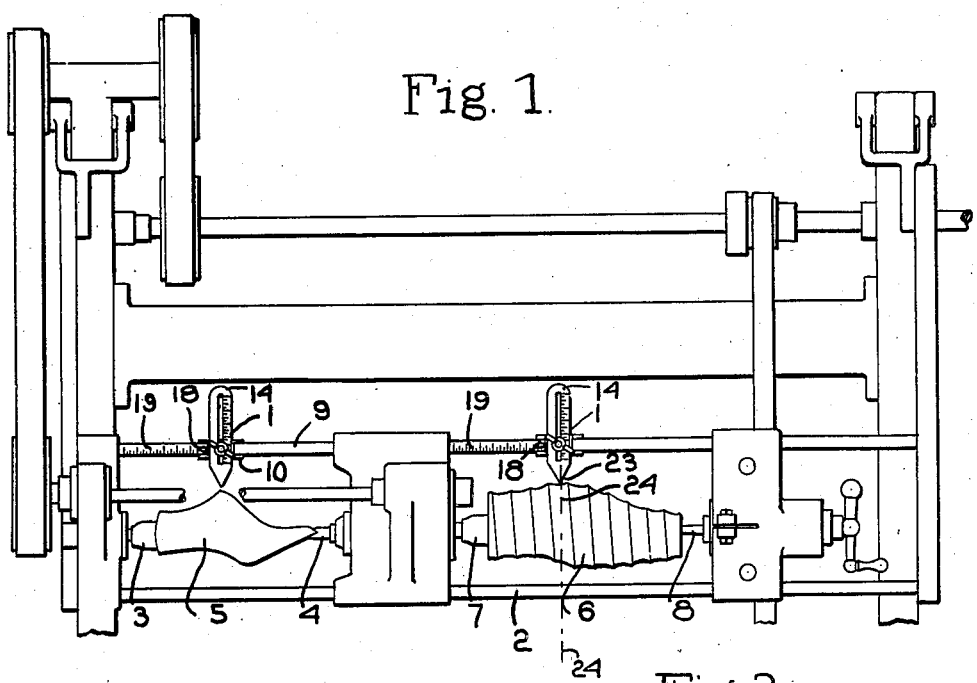
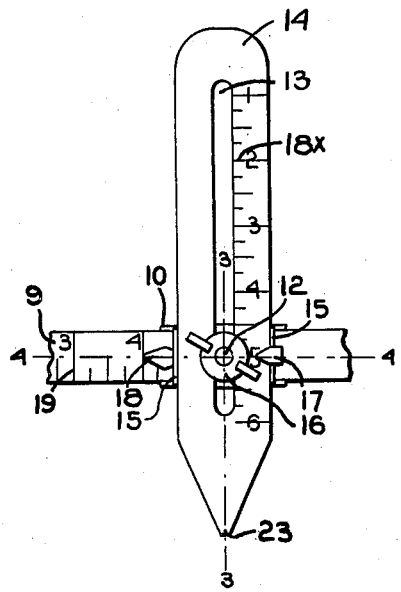
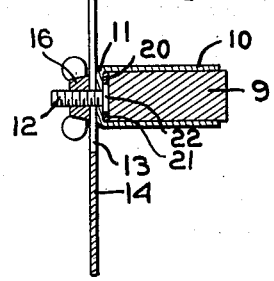
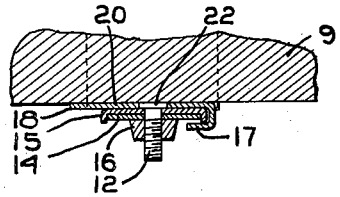
INVENTOR.
Everett Eldrige
BY *Pierce Davis Marion Edmonds*
his ATTORNEYS.

Patented May 30, 1939

2,160,723

UNITED STATES PATENT OFFICE 2,160,723

LAST BLOCK GAUGE FOR LAST LATHES

Everett Eldridge, Portsmouth, Ohio, assignor to Vulcan Corporation, Portsmouth, Ohio Application October 24, 1936, Serial No. 107,344

2 Claims. (Cl. 142—55)

This invention relates to gauging devices for positioning an uncut last block in a last lathe in preparation for the turning operation. It has heretofore been the practice of lathe operators to rely upon their unaided judgment in positioning an uncut block in a lathe. This practice has lead to a condition where many lasts must be rejected because of inaccurate positioning of the block between the lathe centers. Even though the block is over-size, if it is not properly positioned with respect to the lathe centers, the cutter will run away from the block and cause a defect in the turned last.

It is an object of the present invention to provide means for accurately positioning the uncut block between the lathe centers prior to the turning operation.

A further object of the invention resides in the provision of adjustable gauging means which is universally adapted to act as a guide for positioning blocks of any size or contour between the lathe centers.

Another object of the invention is to provide a last block gauging device, which is provided with indication marks for predetermining the adjustments of the gauge.

Other objects and features of the invention will more fully appear from the following description in connection with the accompanying drawing and will be particularly pointed out in the claims.

The present invention provides a very effective method of rapidly and accurately gauging the position of uncut last blocks between centers in the last lathe. Briefly, the invention consists of a gauge applied to the swing frame of the lathe or to the last block supporting means, whatever its form may be. The gauge is adjustable lengthwise along the lathe axis and is also adjustable in and out or toward and from the center about which the last block is to be rotated. The gauge is provided with a vertically adjustable gauging arm bearing indication marks. This gauging arm is adjusted by means of the indication marks into a position from data determined by the size of the last block to be turned and the specifications of the model to be employed in turning the last. In one method of using this gauge, it is adjusted along the lathe axis until the gauging arm is substantially in the plane of the high or comb portion of the block. After these adjustments are made, the operator places the block between centers in the lathe with its comb portion just clearing the lower end of the arm of the gauge. The block is then ready for turning.

The details of the gauge construction and other methods of its use will appear more fully hereinafter.

A particular embodiment of the invention is illustrated in the drawing, wherein Fig. 1 is a front elevation of the upper portion of a standard last turning lathe. Fig. 2 is an enlarged front elevation of the gauge applied to the lathe. Fig. 3 is a vertical cross-sectional view of line 3—3, Fig. 2. Fig. 4 is a horizontal cross-sectional view taken on line 4—4, Fig. 2.

A gauge of the character defined herein may be designed as a fixed element of the last turning lathe or as illustrated herein, it may be constructed to be readily detachable from the lathe. Two of these gauges indicated generally at 1 are shown in Fig. 1 applied to the swing frame 2 of a last lathe. At the model end of the swing frame, the lathe is provided with the usual heel dog 3 and toe dog 4 acting to support and rotate the model 5. The uncut last block 6 is supported by the heel dog 7 and the toe dog 8. One of the gauges 1 is shown co-acting with the model 5, while the other gauge is shown co-acting with block 6. The function and construction of these gauges will appear in detail hereinafter.

The gauges 1 may be attached to the lathe in any suitable manner. As shown herein, the gauges are detachably held in position upon the bar 9 upon the swing frame 2. The gauges are provided with a resilient clip member 10 which embraces the bar 9 and is held in adjusted position thereon by friction. Desirably, the clip member 10 constitutes the support for the remaining elements of the gauge. The front wall 11 of the clip member is drilled to receive a stud bolt 12, the shank of which projects forwardly and through a slot 13 in a vertically adjustable gauge arm 14. The gauge arm 14 desirably is guided during its adjustment by means of the outwardly bent lips 15 engaging the side edges of the arm 14. The lips 15 may be integral with the clip member 10.

A thumb nut 16 is received on the outer end of the stud bolt 12 and acts to clamp the arm 14 upon the clip member 10 in any desired, adjusted position. To facilitate the adjustment of the gauge, it is provided with a pointer 17 co-operating with a scale 18X vertically inscribed upon the arm 14 and another pointer 18 co-operating with a scale 19 inscribed along the length of the bar 9 of the swing frame of the lathe. The pointers 17 and 18 may be arranged upon the gauge in any suitable manner and, as herein shown, are situated upon the extremities of a plate 20. The plate 20 is held between the inner face of the wall 11 and the outer face of the bar 9. An aperture 21 is formed in the plate 20, within which is received the head 22 of the stud bolt 12. The head of the bolt 12 thus functions to position the plate 20 laterally with respect to the arm 14. The pointer 17 is bent forwardly and then back upon itself, thereby to position its pointed end closely adjacent to the characters on the scale 18X. The pointer 18 lies flush along the front face of the bar 9 upon which the characters of the scale 19 are inscribed.

In the use of the gauge, the block may be positioned between centers by setting it to the point 23 of the arm 14 at any selected point upon the surface of the block. A desirable point upon the block to carry out the gauging operation has been found to be the high point of the comb portion of the last block. The first adjustment of the gauge is accomplished by moving it along the bar 9 of the swing frame until the pointed end 23 of the arm 14 lies in plane 24 within which lies the highest point of the block 6. If the vertical position of the arm 14 has not already been determined and tabulated, its vertical setting may be found in the following manner. A block is carefully placed between centers in the lathe in correct position to produce a perfect last. This position may be determined by trial and error or by direct measurement or in any suitable manner. With the block in position to present its comb portion upward, the gauge arm 14 is moved into a position where its point just clears the surface of the block. When the gauge has been thus adjusted, subsequent blocks may be quickly placed in the lathe, using the arm of the gauge as a guide, with the assurance that none of the lasts turned will be rejected on account of defective turning.

Another desirable method of quickly and easily adjusting the gauge for a given block size, is to provide the latter with two gauges, one of which is associated with the model and the other with the block. Under this method, the model is placed between the model heel and toe dog in the usual manner. The gauge arm 14 of the gauge associated with the model is then adjusted into position where it just clears the upper extremity of the comb of the model. The reading on the scale 19 as indicated by the pointer 18 is noted as is also the position of the pointer 17 upon the scale 18X. The gauge associated with the block 6 is now adjusted into a position corresponding to the position of the other gauge, such position being found by duplicating the settings of the pointers and corresponding scales as noted in connection with the model gauge. It is desirable that the scale readings thus obtained, the size of the block and the number of the model used, be tabulated for future reference.

Variations from the above exact procedure may be employed for setting the gauges properly. Some operators may judge it is better practice to allow a certain fixed dimension to exist between the outermost periphery of the block and the outermost position to which the cutter is thrown by the model as the model wheel traverses the comb of the model. A method of making such allowance is to adjust the model gauge so that its indicating arm clears the comb of the model the amount of the desired allowance, which may be a fraction of an inch of the nature of one-quarter or whatever is deemed proper. As the block is turned under these conditions, a chip, the depth of the dimension of the clearance allowed will be removed from the block in the upper extremity of the comb.

Obviously, the gauge may be used in many ways other than those above mentioned. It is well known that the bottom of the usual last block is the best and hardest portion thereof, being nearest the outer periphery of the log from which the blocks are cut. The comb of the block is towards the heart of the tree or the soft, pithy portion of the log. It is desirable, therefore, in some instances, to gauge the blocks from their bottom surfaces. To do this, the model gauge is adjusted into engagement with or slightly away from the bottom surface of the model, preferably at the ball portion thereof. The block gauge is then adjusted to correspond to the model gauge. Before proceeding to turn the block, however, the gauges must be removed from the lathe or moved out of the path of the model and block. In following this latter method, the operator is assured that the hardest and best portion of the last will not be removed by the cutter and that the hard portion will be presented to the severe pressure of the sole leveling and similar operations during the manufacture of a shoe.

The position of the dogs upon the respective end faces of the block is not particularly critical, since there is always much wood to be removed at these points. If, however, the operator properly uses the gauges while placing the block between centers, he will be assured of a perfectly turned last.

Not only does the use of the present invention prevent waste of blocks, but smaller blocks may be used, thereby saving lumber. It has heretofore been the practice to use blocks sufficiently large to minimize the chance of error in placing the blocks in the lathe. By the use of the present invention the size of the blocks may be held to within a relatively close limit to the dimension of the finished last without the possibility of wasting blocks. Furthermore, it will be possible by means of the present invention to utilize many of the blocks that have been discarded as waste due to improper preliminary trimming of the block intended for use in turning a given size of last. These latter blocks, which would ordinarily be thrown out, may readily be used in turning a smaller sized last, provided the blocks are accurately and securely gauged in their position in the lathe.

Having thus described the invention, what is desired to be claimed by Letters Patent of the United States, is:

1. In a last lathe having model and block holding and manipulating instrumentalities, a gauge associated with said model holding instrumentality, a scale on said gauge for indicating the position of the model in the lathe, a gauge associated with said block holding instrumentality, an adjustable arm on said latter gauge and a scale on said latter gauge corresponding to said first mentioned gauge, whereby the gauging arm on said latter gauge may be adjusted to a position corresponding to the gauging position of said first mentioned gauge.

2. In a last lathe comprising heel and toe dogs for reciving a model and an uncut last block, a bar on the lathe frame in proximity to the heel and toe dogs for said last block and substantially parallel to the axis of the dogs therefor, a slide on the bar, a threaded member projecting from the slide, a plate on the slide having an elongated slot through which the threaded member extends, the plate being slidable transversely of said axis to determine the position of the last block in its heel and toe dogs, and means on said threaded member for clamping the plate in an adjusted position on the slide.

EVERETT ELDRIDGE.